United States Patent
Eo et al.

(10) Patent No.: US 9,294,135 B2
(45) Date of Patent: Mar. 22, 2016

(54) DIGITAL RADIO FREQUENCY (RF) RECEIVER

(75) Inventors: Ik Soo Eo, Daejeon (KR); Sang-Kyun Kim, Gyeongsangbuk-do (KR); Mun Yang Park, Daejeon (KR); Seon-Ho Han, Daejeon (KR); Hyun Kyu Yu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 137 days.

(21) Appl. No.: 13/609,638

(22) Filed: Sep. 11, 2012

(65) Prior Publication Data

US 2013/0156141 A1 Jun. 20, 2013

(30) Foreign Application Priority Data

Dec. 14, 2011 (KR) .................... 10-2011-0134809

(51) Int. Cl.
*H04B 1/00* (2006.01)
(52) U.S. Cl.
CPC .................... *H04B 1/0021* (2013.01)
(58) Field of Classification Search
CPC ..... H04B 1/001; H04B 1/0021; H04B 1/0046
USPC ................. 375/316, 324, 346, 350
See application file for complete search history.

(56) References Cited

U.S. PATENT DOCUMENTS

| 6,433,726 | B1 * | 8/2002 | Fan .................................. 341/155 |
| 6,459,743 | B1 | 10/2002 | Lipka |
| 6,944,219 | B2 | 9/2005 | Mathe |
| 2007/0237242 | A1 | 10/2007 | Gjertsen |
| 2008/0013653 | A1 * | 1/2008 | Fudge ................ H04B 1/71637 375/345 |
| 2008/0013654 | A1 * | 1/2008 | Rick .................... H03G 3/3068 375/345 |
| 2009/0181629 | A1 | 7/2009 | Dauphinee |
| 2010/0118921 | A1 * | 5/2010 | Abdelmonem et al. ...... 375/148 |
| 2011/0182388 | A1 * | 7/2011 | Kim et al. ..................... 375/345 |

FOREIGN PATENT DOCUMENTS

| KR | 100303311 B1 | 7/2001 |
| KR | 1020010104054 A | 11/2001 |
| KR | 100645924 B1 | 11/2006 |

OTHER PUBLICATIONS

Rim Barrak et al., "Optimized Multistandard RF Subsampling Receiver Architecture", IEEE Transactions on Wireless Communications, Jun. 2009, pp. 2901-2909, vol. 8, No. 6.

* cited by examiner

*Primary Examiner* — Curtis Odom
(74) *Attorney, Agent, or Firm* — Rabin & Berdo, P.C.

(57) ABSTRACT

A digital RF receiver does not use a separate receiver according to a mode and a band for multi-mode reception, MIMO reception, and bandwidth extension reception, and changes only setting variables in a single receiver structure so as to implement multi-mode reception, MIMO reception, bandwidth extension reception, and/or simultaneous multi-mode operation, such that complexity of the receiver, development cost, and power consumption can be reduced.

7 Claims, 5 Drawing Sheets

FIG. 5

RF: Carrier frequency0, Carrier frequency1, Carrier frequency2, Carrier frequency3, Carrier frequency4, Bandwidth0, Bandwidth1, Bandwidth2, Bandwidth3, Bandwidth4, Input sampling rate0, Input sampling rate1, Input sampling rate2, Input sampling rate3, Input sampling rate4, VGA_EN0, VGA_EN1, VGA_EN2, VGA_EN3, VGA_EN4

DFE: Bandwidth0, Bandwidth1, Bandwidth2, Bandwidth3, Bandwidth4, IF0, IF1, IF2, IF3, IF4, Integer decimation rate0, Integer decimation rate1, Integer decimation rate2, Integer decimation rate3, Integer decimation rate4, Rational decimation rate0, Rational decimation rate1, Rational decimation rate2, Rational decimation rate3, Rational decimation rate4, Output sampling rate0, Output sampling rate1, Output sampling rate2, Output sampling rate3, Output sampling rate4, DFE_EN0_0, DFE_EN0_1, DFE_EN0_2, DFE_EN0_3, DFE_EN1_0, DFE_EN1_1, DFE_EN1_2, DFE_EN1_3, DFE_EN2_0, DFE_EN2_1, DFE_EN2_2, DFE_EN2_3, DFE_EN3_0, DFE_EN3_1, DFE_EN3_2, DFE_EN3_3, Mixer_EN0, Mixer_EN1, Mixer_EN2, Mixer_EN3, DC_EN, IQ_EN

DIGITAL RADIO FREQUENCY (RF) RECEIVER

CROSS-REFERENCE TO RELATED APPLICATION

The present application claims priority to Korean patent application number 10-2011-0134809, filed on Dec. 14, 2011, which is incorporated by reference in its entirety.

BACKGROUND OF THE INVENTION

The present invention relates to a digital radio frequency (RF) receiver, and more particularly to a digital RF receiver which changes only setting variables in a single receiver so that it can implement multi-mode reception, Multiple Input Multiple Output (MIMO) reception, and bandwidth extension reception.

RF transmission/reception signals for use in wireless communication generally have different bands and different bandwidths according to various communication standards, and may also have a plurality of bands and a plurality of bandwidths in only one standard as necessary.

In recent times, a new communication standard has been proposed to increase a signal transfer rate, and the MIMO scheme and the bandwidth extension technology capable of simultaneously transmitting signals through a plurality of bands have also been proposed, such that wireless communication RF transmission/reception characteristics have become more diverse and complex.

The related arts of the present invention are disclosed in Korean Patent Laid-open Publication No. 2000-0066935 (entitled "CIRCUIT AND DEVICE FOR RECEIVING RF SIGNALS IN MOBILE COMMUNICATION TERMINAL"), Korean Patent Laid-open Publication No. 2001-0010375 (entitled "APPARATUS FOR TRANSMITTING/RECEIVING MULTI-BAND HIGH-FREQUENCY SIGNAL OF MOBILE COMMUNICATION TERMINAL), and Korean Patent Laid-open Publication No. 2001-0104054 (entitled "RF RECEIVER FOR USE IN MOBILE COMMUNICATION TERMINAL).

However, according to a conventional RF receiver based on analog technology, a new RF receiver is designed/manufactured whenever a new standard is proposed and its associated band and bandwidth are newly added, such that an RF reception function chip is developed and applied to a terminal (hereinafter referred to as a user equipment (UE)), resulting in an increase in time and cost needed for such development.

In addition, when manufacturing a UE capable of supporting a variety of communication standards, a plurality of chips capable of restrictively supporting only individual standards are unavoidably mounted to the UE, such that the size and power consumption of the UE are unavoidably increased.

In addition, if a requested signal has a high transfer rate, the conventional RF receiver simultaneously receives signals of multiple antennas or simultaneously receives signals through multiple bands, such that the RF receiver becomes more complicated in construction.

SUMMARY OF THE INVENTION

Various embodiments of the present invention are directed to providing a digital RF receiver that substantially obviates one or more problems due to limitations or disadvantages of the related art. Embodiments of the present invention provide a digital RF receiver which does not use a separate receiver according to a mode and a band for multi-mode reception, MIMO reception, and bandwidth extension reception, and changes only setting variables in a single receiver structure so as to implement multi-mode reception, MIMO reception, bandwidth extension reception, and/or simultaneous multi-mode operation, such that complexity of the receiver, development cost, and power consumption can be reduced.

In accordance with one embodiment, a digital RF receiver includes: an antenna unit for outputting a signal received at an antenna; a radio frequency (RF) unit for converting the received signal into a digital reception signal, and outputting the digital reception signal; and a digital front end (DFE) unit for performing a decimation process for the digital reception signal and removing an interference signal component of a contiguous band.

M digital RF receivers (where m is a natural number), each of which includes the antenna unit, the RF unit, and the digital front end (DFE) unit, may be arranged in parallel.

Variables of a carrier frequency, a bandwidth, and an input sampling rate are established in the RF unit, and variables of a bandwidth, an integer decimation rate, a rational decimation rate, and an output sampling rate may be established in the digital front end (DFE) unit.

In accordance with other embodiment, a receiver set includes: a plurality of digital RF receivers, wherein each of the plurality of digital RF receivers includes: an antenna unit for outputting a signal received at an antenna; a radio frequency (RF) unit for converting the received signal into a digital reception signal, and outputting the digital reception signal; and a digital front end (DFE) unit for performing a decimation process for the digital reception signal and removing an interference signal component of a contiguous band.

M digital RF receivers (where m is a natural number), each of which includes the antenna unit, the RF unit, and the digital front end (DFE) unit, may be arranged in parallel.

N receiver sets may be provided, each of the n receiver sets including the m digital RF receivers in such a manner that m antenna units are available.

Variables of a carrier frequency, a bandwidth, and an input sampling rate are established in the RF unit, and variables of a bandwidth, an integer decimation rate, a rational decimation rate, and an output sampling rate may be established in the digital front end (DFE) unit.

BRIEF DESCRIPTION OF THE DRAWINGS

FIG. 5 shows setting variables of the bandwidth extension digital RF receiver shown in FIG. 4.

DESCRIPTION OF SPECIFIC EMBODIMENTS

Figure 1:
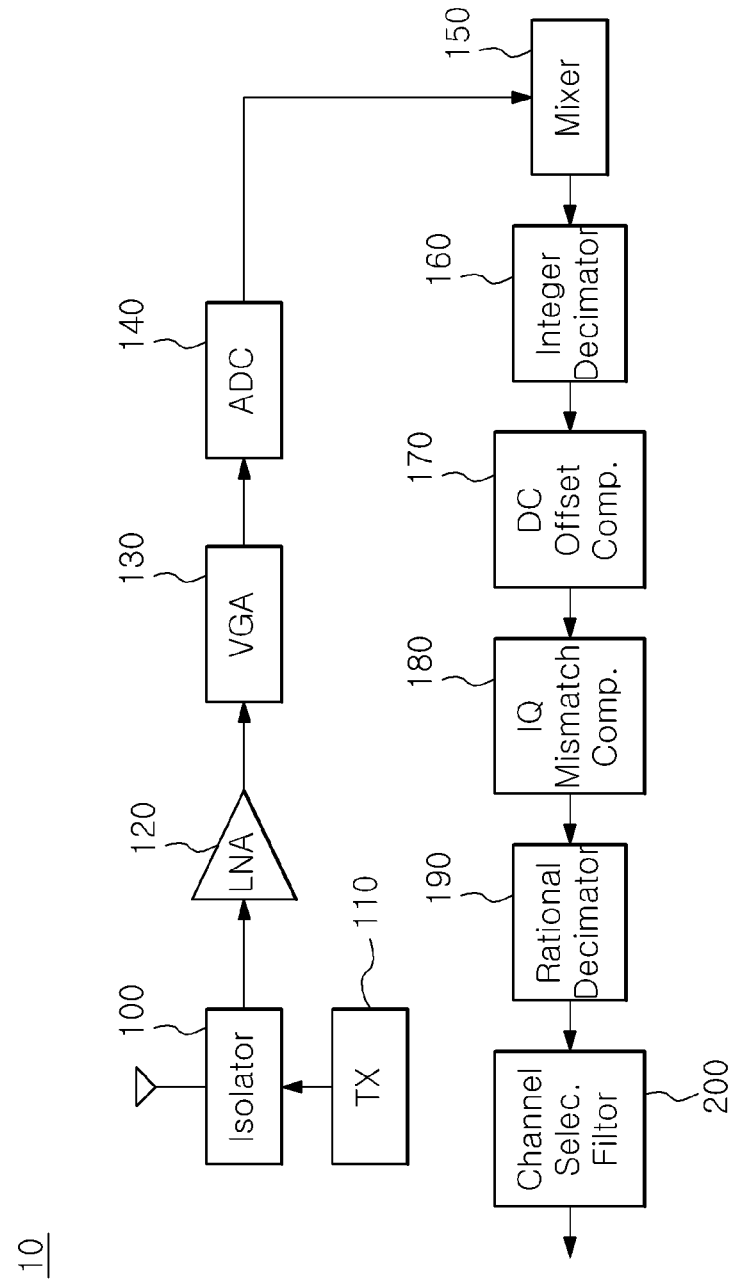
FIG. 1 is a block diagram illustrating a digital RF receiver according to one embodiment of the present invention.

Hereinafter, a digital RF receiver in accordance with the present invention will be described in detail with reference to the accompanying drawings. In the drawings, line thicknesses or sizes of elements may be exaggerated for clarity and convenience. Also, the following terms are defined considering function of the present invention, and may be differently defined according to intention of an operator or custom. Therefore, the terms should be defined based on overall contents of the specification.

FIG. 1 is a block diagram illustrating a digital RF receiver according to one embodiment of the present invention.

Referring to FIG. 1, the digital RF receiver 10 according to one embodiment of the present invention includes am antenna, an isolator 100, a transmission (Tx) block 110, a Low Noise Amplifier (LNA) 120, a variable gain amplifier (VGA) 130, an analog-to-digital converter (ADC) 140, a mixer 150, an integer decimator 160, a DC offset compensator 170, an IQ mismatch compensator 180, a rational decimator 190, and a channel selection filter 200.

The digital RF receiver 10 receives a signal through an antenna, inputs the received signal to the isolator for isolating a transmission signal of the transmission block 110, and finally inputs the isolated signal to the LNA 120, such that thermal noise is reduced and the resultant signal is amplified.

The LNA 120 serves as a low noise amplifier that has a band selection function capable of amplifying only a signal of the selected band, such that it can selectively amplify a signal in response to the magnitude of a bandwidth to be received. Therefore, the output signal of the LNA 120 is a bandwidth-limited signal.

In order to perform mapping of the magnitude of a signal to the entire output bits of the ADC 140 before applying the corresponding signal to the ADC 140, the variable gain amplifier (VGA) 130 performs processing for adjusting a signal level.

The band-limitation RF signal to be received is converted into a digital signal after passing through the ADC 140. The resultant digital signal is input to the mixer 150 so as to remove an intermediate frequency (IF) signal contained in the corresponding signal. In-phase (I) and Quadrature-phase (Q) signals are generated by processing of the mixer 150.

On the other hand, in order to convert a sampling signal of the ADC 140 into a sampling rate requested by a communication standard, integer decimation and rational decimation are carried out in the integer decimator 160 and the rational decimator 190, respectively. The DC offset compensator 170 is used to remove DC components from the received signal. The IQ mismatch compensator 180 is used to remove image components, and the channel selection filter 200 is used to remove interference signal component of a neighbor or contiguous band.

The DC offset compensator 170 for performing a DC offset cancellation function may also be located behind the mixer 150 so as to increase the efficiency of digital signal processing. In addition, a block for controlling a signal gain may be contained in the integer decimator 160 and the channel selection filter 200, respectively.

Figure 2:
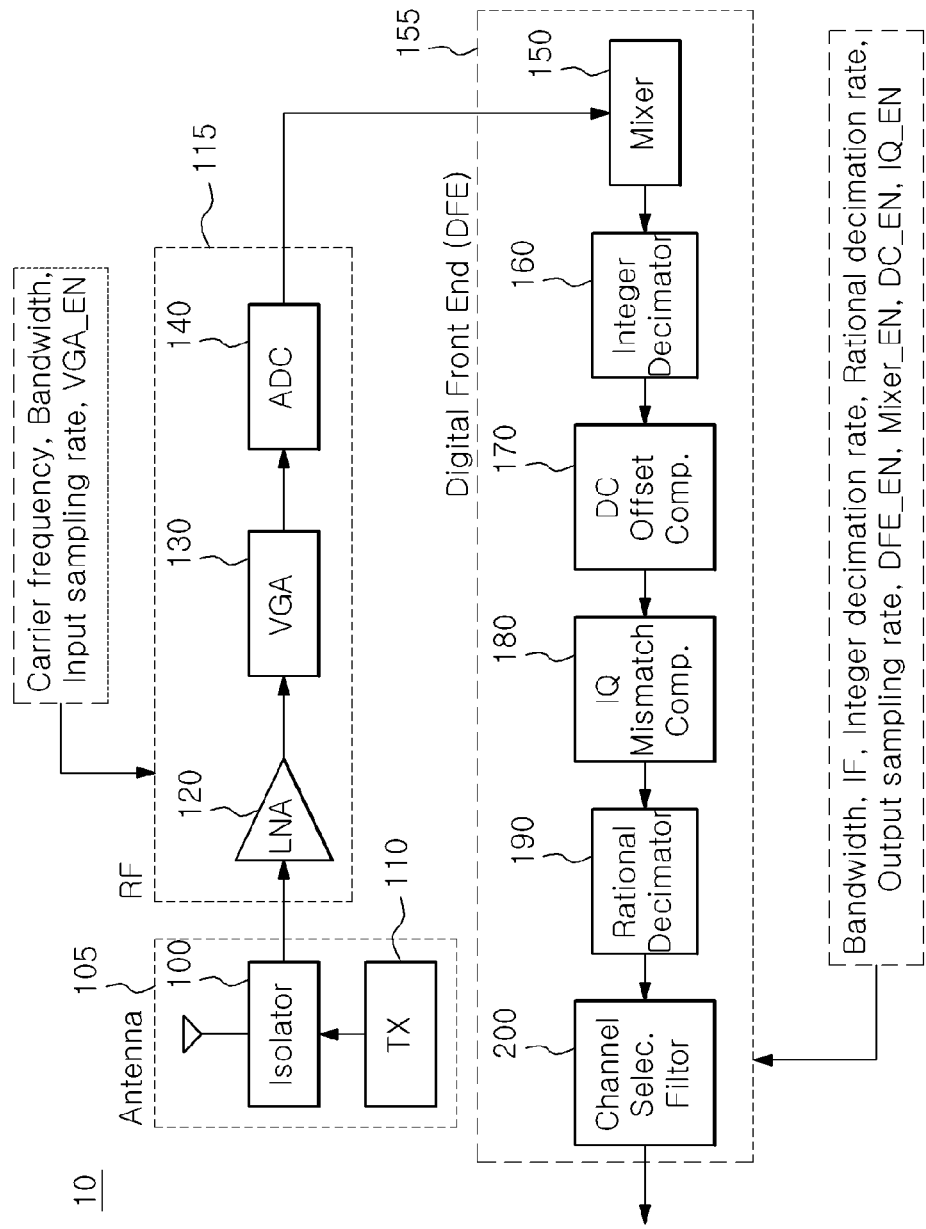
FIG. 2 is a block diagram illustrating a multi-mode digital RF receiver according to another embodiment of the present invention.

FIG. 2 is a block diagram illustrating a multi-mode digital RF receiver according to another embodiment of the present invention.

Referring to FIG. 2, the digital RF receiver 10 according to another embodiment of the present invention may include an antenna unit 105, an RF unit 115, and a digital front end (DFE) unit 155.

The antenna unit 105 may include an antenna, an isolator 100, and a transmission block 110. The RF unit 115 may include a low noise amplifier (LNA) 120, a variable gain amplifier (VGA) 130, and an ADC 140.

The DFE unit 155 may include a mixer 150, an integer decimator 160, a DC offset compensator 170, an IQ mismatch compensator 180, a rational decimator 190, and a channel selection filter 200.

A multi-mode is used to support different wireless access standards, and has different carrier frequencies, different bandwidths, and different input sampling rates in terms of an RF signal.

Referring to exemplary setting variables shown in FIG. 2, a carrier frequency and a bandwidth in response to each mode shown in the digital RF receiver of FIG. 1 are set to an LNA reception band and bandwidth of the RF unit 115 and a sampling rate of the ADC 140 shown in FIG. 2, respectively. The DFE unit 155 establishes the mixer, the integer and rational decimator filters, and the channel selection filter according to a bandwidth and an output sampling rate, such that it can also be used as a multi-mode digital RF receiver.

In this case, information as to whether mixing is used, information as to whether DC offset cancellation is used, and information as to whether IQ signals are compensated can be established according to an input signal.

That is, the RF receiver shown in FIG. 2 can operate as a multi-mode digital RF receiver according to setting of various variables shown in FIG. 2.

Figure 3:
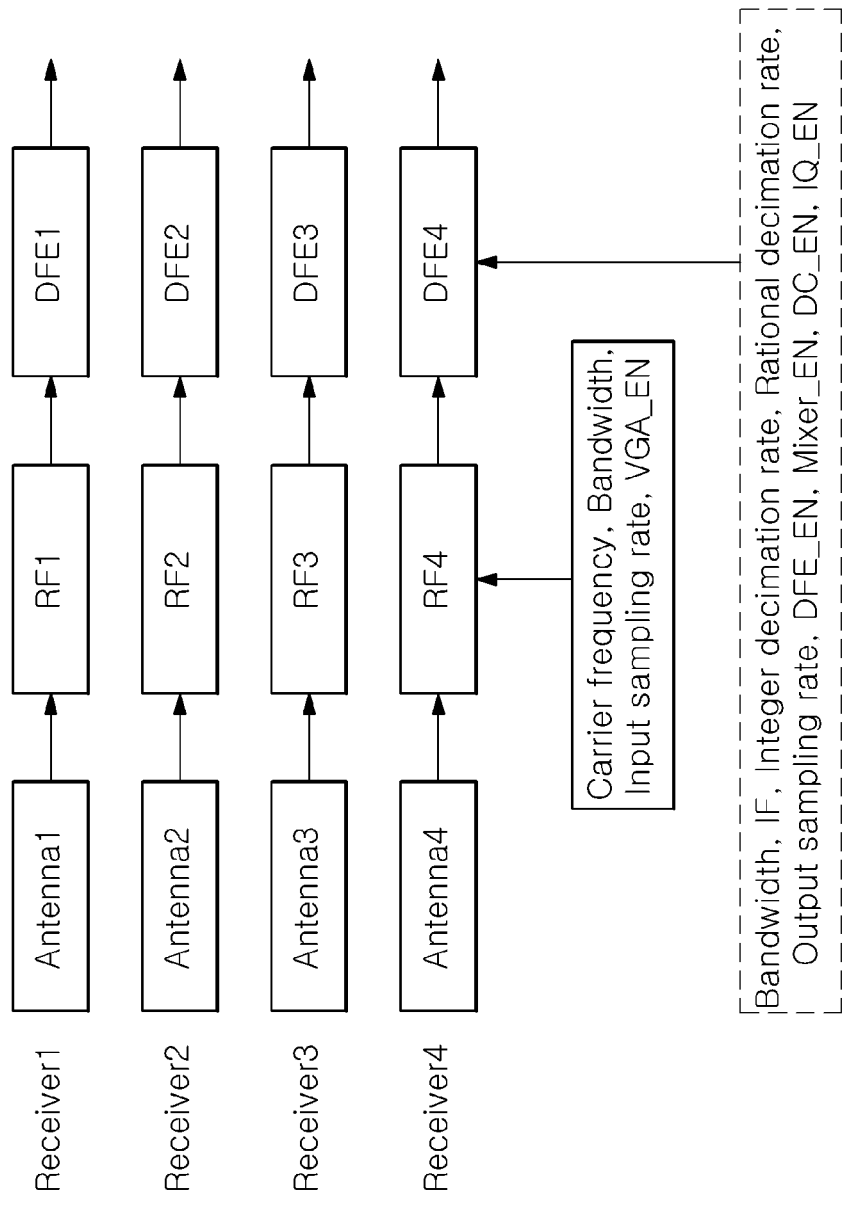
FIG. 3 is a block diagram illustrating a MIMO digital RF receiver according to still another embodiment of the present invention.

FIG. 3 is a block diagram illustrating a MIMO digital RF receiver according to still another embodiment of the present invention.

The digital RF receiver shown in FIG. 3 is used upon receiving signals from four different transmission antennas.

In the case of using the MIMO scheme, four receivers (Receiver1, Receiver2, Receiver3, and Receiver4) are configured to receive the same band signals and the same bandwidth signals.

Therefore, the RF receiver exemplarily shown in FIG. 2 may be configured to be repeated four times in parallel. For reference, RF1, DFE1, etc. shown in FIG. 3 are identical to those of FIG. 2.

In order to implement the MIMO scheme, the MIMO digital RF receiver may selectively adjust variables (DFE_EN0, DFE_EN1, DFE_EN2, and DFE_EN3) according to a transmission antenna structure.

For example, in the case of using only one transmission antenna, one variable (DFE_EN0) may be set to 1, and each of the remaining variables (DFE_EN1, DFE_EN2 and DFE_EN3) may be set to zero '0'. In the case of using two transmission antennas, DFE_EN0 or DFE_EN1 may be set to 1, and DFE_EN2 or DFE_EN3 may be set to zero '0'. Assuming that all the four transmission antennas are used, DFE_EN0, DFE_EN1, DFE_EN2 or DFE_EN3 may be set to '1'.

Setting variables are performed in the corresponding block, and the same-value variable may be assigned to individual blocks (for example, RF1 and RF2, or DFE1 and DFE2).

Figure 4:
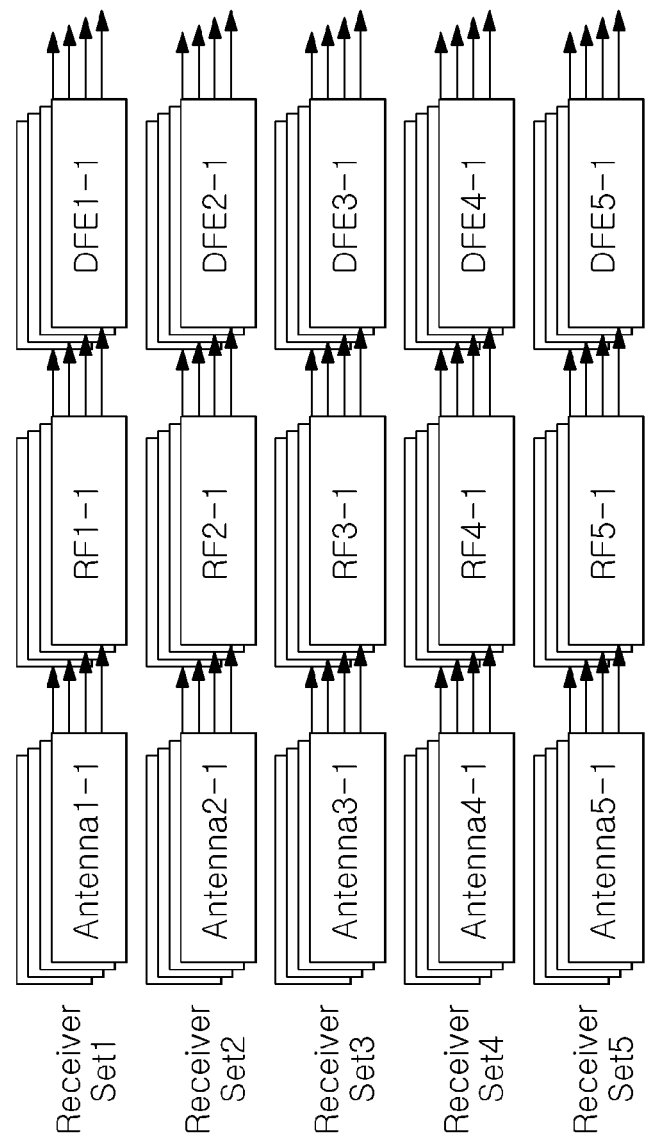
FIG. 4 is a block diagram illustrating a bandwidth extension RF receiver according to another embodiment of the present invention.

FIG. 4 is a block diagram illustrating a bandwidth extension RF receiver according to another embodiment of the present invention. FIG. 5 shows setting variables of the bandwidth extension digital RF receiver shown in FIG. 4.

In more detail, FIG. 4 illustrates a bandwidth extension structure for the MIMO digital RF receiver shown in FIG. 3. The bandwidth extension RF receiver shown in FIG. 4 receives a carrier frequency using a maximum of four reception antennas, and a maximum number of received carrier frequencies may be set to 5.

Referring to FIG. 4, a first receiver set (Receiver Set1) receives a first carrier frequency (Carrier Frequency 1), a second receiver set (Receiver Set2) receives a second carrier frequency (Carrier Frequency 2), a third receiver set (Receiver Set3) receives a third carrier frequency (Carrier Frequency 3), a fourth receiver set (Receiver Set4) receives a fourth carrier frequency (Carrier Frequency 4), and a fifth receiver set (Receiver Set5) receives a fifth carrier frequency (Carrier Frequency 5). Different carrier frequencies and different bandwidths are assigned to individual receiver sets for use in individual carrier frequencies.

Although 5 parallel receiver sets corresponding to individual carrier frequencies are exemplarily shown in FIG. 4 in such a manner that a maximum of 5 carrier frequencies can be simultaneously received, the scope or spirit of the present invention is not limited thereto because the above-mentioned example is disclosed only for illustrative purposes, such that it should be noted that the number of carrier frequencies capable of being simultaneously received can be increased or reduced as necessary.

In FIG. 4, according to individual bands to be used, different antennas may be used, or the same antenna may also be commonly used as necessary. However, a signal is isolated using different antennas in a MIMO mode. The sampling frequency of the ADC may utilize the same sampling frequency irrespective of a carrier frequency. If the ADC is able to use another sampling frequency, an intermediate frequency (IF) value is changed according to the sampling frequency.

In this case, if a signal bandwidth of the RF output signal is higher than that of the DFE unit, the RF output signal can be divisionally processed by a plurality of DFE units.

Referring to FIG. 5, a variety of setting variables may be used for the bandwidth extension digital RF receiver. In more detail, a variety of setting variables depending upon a carrier frequency used for bandwidth extension may be used, for example, a carrier frequency, a bandwidth, an input sampling rate, an IF, an integer decimation rate, a rational decimation rate, an output sampling rate, Mixer_EN, etc. DFE_EN may be determined according to the number of used antennas and the number of carrier frequencies. However, VGA_EN, DC_EN, and IQ_EN may be determined irrespective of the number of used antennas and the number of carrier frequencies.

If the setting variables shown in FIG. 5 are adaptively applied to the digital RF receiver shown in FIG. 4, the resultant digital RF receiver capable of simultaneously transmitting various standards may also be configured. That is, the setting variables shown in FIG. 5 are not restrictively applied to only one standard, and may also be simultaneously applied to a plurality of standards as necessary.

As described above, the digital RF receiver according to the embodiments of the present invention may operate as a multi-mode digital RF receiver, a MIMO digital RF receiver and/or a bandwidth extension digital RF receiver.

The RF reception signal is input to a low noise amplifier (LNA) through an antenna and a duplexer for separating transmission/reception signals. A noise component of the signal applied to the LNA is prevented from being amplified, and the magnitude of signal is increased. In addition, the LNA performs a band-limiting filter function, such that it can sufficiently convert a signal component of a band to be received by the ADC into a digital signal. As a result, the LNA can previously remove overlapped noise generated in a decimation process.

In order to allow an input signal of the ADC to have an optimum magnitude, the signal is input to the ADC through the VGA. In addition, a specific function for compensating a DC offset and an IQ mismatch that are considered to be distortion components of the resultant digital signal.

In order to satisfy the sampling rate requested by the standard, integer decimation and rational decimation are processed in the digital sampling rate, and the processed result is input to the channel selection filter so as to filter a signal of a neighbor band of a signal band.

Undesired interference signals are filtered (or removed) through the integer decimation filter and the channel selection filter, such that a gain control function for properly increasing the magnitude of signal is needed. If a reception signal of the digital signal output from the ADC has an intermediate frequency (IF) according to the ADC sampling rate, a digital mixer for IF cancellation is used to process the reception signal. Integer decimation or rational decimation is performed according to the ADC sampling rate.

In addition, band, bandwidth, input sampling rate, output sampling rate, the use or disuse of a mixer, IQ mismatch correction, DC offset correction, and a signal gain are established to perform the digital RF function capable of supporting multiple modes (multi-mode), multiple bands (multi-band), and multiple bandwidths (multi-bandwidth).

The multi-mode supports a variety of wireless access standards, and has different bands, different bandwidths, and different sampling rates according to wireless access standards. The multi-band can utilize one wireless access standard in a plurality of bands, such that it can transmit a signal by assigning different bands to individual service enterprisers.

Meanwhile, the MIMO scheme and the bandwidth extension scheme are used to support a higher transfer rate within a limited contiguous bandwidth. The MIMO scheme transmits different information pieces through a plurality of transmission antennas, and isolates different transmission signals using independent reception antennas, such that it requires as many receivers as the number of reception antennas. The bandwidth extension scheme transmits a user signal using different bands, and simultaneously receives signals of different bands using the receiver, resulting in an increase in signal transfer rate.

As is apparent from the above description, the digital RF receiver according to the embodiments of the present invention does not use a separate receiver according to a mode and a band for multi-mode reception, MIMO reception, and bandwidth extension reception, and changes only setting variables in a single receiver structure so as to implement multi-mode reception, MIMO reception, bandwidth extension reception, and/or simultaneous multi-mode operation, such that complexity of the receiver, development cost, and power consumption can be reduced.

While the present invention has been described with respect to the specific embodiments, it will be apparent to those skilled in the art that various changes and modifications may be made without departing from the spirit and scope of the invention as defined in the following claims.

What is claimed is:

1. A digital RF receiver comprising:
an antenna unit configured to output a signal received at an antenna;
a radio frequency (RF) unit configured to convert the received signal into a digital reception signal, and output the digital reception signal; and
a digital front end (DFE) unit configured to perform a decimation process for the digital reception signal and remove an interference signal component of a contiguous band,
wherein variables of an input sampling rate, a carrier frequency and a bandwidth are established in the RF unit, and
wherein variables of an output sampling rate, a bandwidth, an inter frequency (IF), an integer decimation rate and a rational decimation rate are established in the DFE unit.

2. The digital RF receiver of claim 1, wherein m digital RF receivers (where m is a natural number), each of which includes the antenna unit, the RF unit, and the DFE unit, are arranged in parallel.

3. The digital RF receiver of claim 1, wherein the DFE unit comprises a DC offset compensator configured to remove a DC component from the received signal.

4. The digital RF receiver of claim 1, wherein the DFE unit comprises an IQ mismatch compensator configured to remove image components from the received signal.

5. A receiver set comprising:
a plurality of digital RF receivers,
wherein each of the plurality of digital RF receivers includes:
an antenna unit configured to output a signal received at an antenna;
a radio frequency (RF) unit configured to convert the received signal into a digital reception signal, and output the digital reception signal; and
a digital front end (DFE) unit configured to perform a decimation process for the digital reception signal and remove an interference signal component of a contiguous band,
wherein variables of an input sampling rate, a carrier frequency and a bandwidth are established in the RF unit,
wherein variables of an output sampling rate, a bandwidth, an inter frequency (IF), an integer decimation rate and a rational decimation rate are established in the DFE unit.

6. The receiver set of claim 5, wherein m digital RF receivers (where m is a natural number), each of which includes the antenna unit, the RF unit, and the DFE unit, are arranged in parallel.

7. The receiver set of claim 6, wherein n receiver sets are provided, each of the n receiver sets including the m digital RF receivers in such a manner that m antenna units are available.

* * * * *